(12) United States Patent
Sunaga et al.

(10) Patent No.: US 6,617,719 B2
(45) Date of Patent: Sep. 9, 2003

(54) BRUSHLESS MOTOR

(75) Inventors: Hideki Sunaga, Gunma (JP); Takeshi Ohba, Tochigi (JP); Kazunori Yamada, Tochigi (JP); Katsuhiro Machida, Gunma (JP); Hiromi Kawarai, Tochigi (JP); Yoshinori Asayama, Tochigi (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/780,431

(22) Filed: Feb. 12, 2001

(65) Prior Publication Data

US 2002/0053843 A1 May 9, 2002

(30) Foreign Application Priority Data

Mar. 2, 2000 (JP) ........................................ 2000-057285
Mar. 24, 2000 (JP) ........................................ 2000-085392

(51) Int. Cl.⁷ ................................................ H02K 1/32
(52) U.S. Cl. ......................... 310/64; 310/67 R; 310/89; 310/68 R; 310/71
(58) Field of Search ............................. 310/52, 53, 58, 310/64, 67 R, 89, 68 R, 71

(56) References Cited

U.S. PATENT DOCUMENTS

| | | | | |
|---|---|---|---|---|
| 5,691,584 A | * | 11/1997 | Toida et al. ............... | 180/65.5 |
| 5,969,445 A | * | 10/1999 | Horiuchi et al. .............. | 310/64 |
| 6,107,708 A | * | 8/2000 | Yamaguchi et al. .......... | 310/58 |
| 6,107,716 A | * | 8/2000 | Penketh ...................... | 180/443 |
| 6,229,226 B1 | * | 5/2001 | Kramer et al. ............. | 307/10.1 |
| 6,236,126 B1 | * | 5/2001 | Yagi et al. .................. | 310/261 |
| 6,278,207 B1 | * | 8/2001 | Matsumoto ................ | 310/68 R |
| 6,297,572 B1 | * | 10/2001 | Sunaga et al. ................ | 310/64 |

FOREIGN PATENT DOCUMENTS

JP            9-191625            7/1997

* cited by examiner

Primary Examiner—Dang Le
(74) Attorney, Agent, or Firm—Foley & Lardner

(57) ABSTRACT

A brushless motor includes a circuit protecting case, a holder disposed on the case, a motor shaft rotatably held by the holder, a stator disposed about the holder, a yoke fixed to the motor shaft to rotate therewith, permanent magnets held by the yoke, and a circuit substrate held in the circuit protecting case. The stator includes a plurality of coils which surround the motor shaft. The circuit substrate contains a drive circuit and a control section. The drive circuit includes a switching section which switches the current path directed to the coils of the stator. A partition wall, provided in the circuit protection case, partitions the interior of the case into a first chamber and a second chamber.

5 Claims, 17 Drawing Sheets

72, 73

74

BRUSHLESS MOTOR

BACKGROUND OF THE INVENTION

1. Field of the Invention

The present invention relates in general to brushless motors and more particularly to brushless motors of a type which exhibits a satisfied heat proof performance and is easy to be assembled.

2. Description of the Prior Art

In order to clarify the task of the present invention, two conventional brushless motors will be briefly described with reference to FIGS. 16 and 17 of the accompanying drawings.

In FIG. 16, there is shown one conventional brushless motor 100. The motor 100 comprises a drive circuit 102 for driving a motor shaft 104. The drive circuit 102 generally comprises a filter section which filters out surges from a supplied electric power, a switching section which switches the path of the current from the filter section toward a stator 106 thereby to vary the magnetic fields generated by the stator 106 and a control section which controls rotation of the motor shaft 104 by controlling the switching timing of the switching section. These sections of the drive circuit 102 are all arranged on a circuit substrate 108. The circuit substrate 108 is accommodated in a circuit protection case 110.

The switching section comprises a plurality of switching elements 112 which switch the path of current directed to coils 114 of the stator 106, and the control section comprises electronic parts 107 which control the switching timing of the switching elements 112. Since the switching elements 112 produce a considerable amount of heat under operation, these elements 112 are attached to a heat sink 115 which is formed with a plurality of heat radiation fins 116. That is, under operation of the motor 100, the heat generated by the switching elements 112 is transmitted to the heat sink 115 and released to the open air by the heat radiation fins 116.

However, hitherto, it has been difficult to effectively release the heat of the switching elements 112 to the open air. In fact, if the motor 100 is designed to generate a higher output, the switching elements 112 are forced to generate a marked heat inevitably and thus it becomes necessary to use high heat-proof and thus expensive ones as the electronic parts 107 of the control section of the drive circuit 102.

In FIG. 17, there is shown the other conventional brushless motor 200 which is shown in Laid-open Japanese Patent Publication 9-191625. The motor 200 comprises a drive circuit 202 for driving a motor shaft 204. The drive circuit 202 is accommodated in a circuit protection case 210. The drive circuit 202 is printed on a circuit substrate 212, and generally comprises a filter section 202a which filters our surges from a supplied power, and a control section 202b which controls magnetic fields of a stator 214 by switching the path of the current from the filter section 202a at given intervals. The control section 202b comprises a plurality of switching elements 216 which switch the path of current directed to coils 214a of the stator 214. The switching elements 216 are attached to a heat sink 218 formed with a plurality of heat radiation fins 218a. Thus, under operation of the motor 200, the heat generated by the switching elements 216 is transmitted to the heat sink 218 and released to the open air from the heat radiation fins 218a.

The coils 214a of the stator 214 and the control section 202b of the drive circuit 202 are connected through terminal pins 220 which extend from the coils 214a to bus bars 224 which, in turn are connected to joint bars 222 held by the circuit substrate 212.

However, employment of the terminal pins 220, joint bars 222 and bus bars 224 for connecting the control section 202b to the coils 214a has caused a troublesome and time-consuming work for assembling the motor 200. For example, for welding given portions of the bus bars 224 to the joint bars 222 and the terminal pins 220, it is necessary to precisely hold the bus bars 224 at given positions before carrying out the welding work.

SUMMARY OF THE INVENTION

It is therefore an object of the present invention to provide a brushless motor which is free of the above-mentioned drawbacks.

According to the present invention, there is provided a brushless motor which is constructed to suppress or at least minimize undesired heat transmission from a heat generating switching section of a drive circuit to a control section of the same.

According to the present invention, there is further provided a brushless motor which is easily assembled.

According to the present invention, there is provided a brushless motor which comprises a circuit protecting case; a holder disposed on the case; a motor shaft rotatably held by the holder; a stator disposed about the holder, the stator including a plurality of coils which surround the motor shaft; a yoke fixed to the motor shaft to rotate therewith, the yoke covering the stator with a given space therebetween; permanent magnets held by the yoke; a circuit substrate tightly held in the circuit protecting case; a drive circuit arranged on the circuit substrate, the drive circuit including a switching section which switches the path of current directed to the coils of the stator and a control section which controls a switching timing of the switching section, the switching section including a plurality of switching elements which generate a certain heat when operated; and a partition wall provided in the circuit protection case to partition the interior of the case into a first chamber to which the switching elements of the switching section are exposed and a second chamber to which the control section is exposed.

BRIEF DESCRIPTION OF THE DRAWINGS

Other objects and advantages of the present invention will become apparent from the following description when taken in conjunction with the accompanying drawings, in which:

FIGS. 13A and 13B are back views of connector terminals employed in the brushless motor of the second embodiment, wherein FIG. 13A is the view of an earth or plus terminal and FIG. 13B is the view of a signal terminal;

FIGS. 15A, 15B and 15C are back views of connector terminals employed in the modified unit of FIG. 14, wherein FIG. 15A shows an earth terminal, FIG. 15B shows a signal terminal and FIG. 15C shows a plus terminal;

DETAILED DESCRIPTION OF THE EMBODIMENTS

Figure 1:
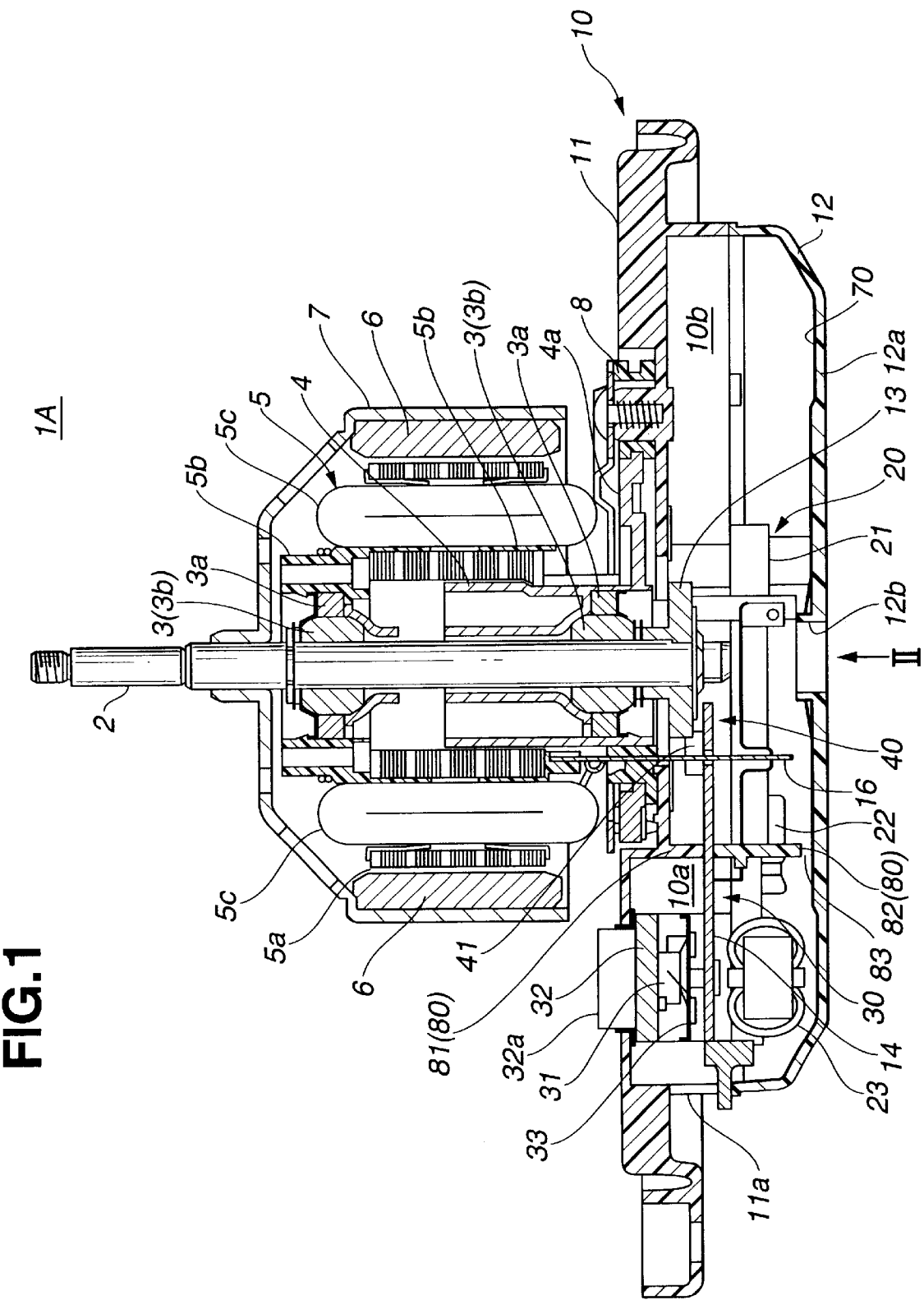
FIG. 1 is a sectional view of a brushless motor which is a first embodiment of the present invention.

In the following, two embodiments 1A and 1B of the present invention will be described in detail with reference to the accompanying drawings. For ease of understanding, various directional terms, such as, right, left, upper, lower, rightward, leftward and the like are used in the following description. However, such terms are to be understood with respect to only a drawing or drawings on which the directed part or portion is shown.

Referring to FIGS. 1 to 7, there is shown a brushless motor 1A which is a first embodiment of the present invention. The brushless motor 1A is suitable for driving a blower fan (not shown) used in an automotive air conditioner.

The brushless motor 1A comprises a motor shaft 2 to which the blower fan is connected. The motor shaft 2 is rotatably held in a cylindrical holder 4 through a pair of bearings 3.

Disposed about the cylindrical holder 4, there is tightly disposed a stator 5. The stator 5 comprises a core 5a which includes laminated metal films, a pair of insulating members 5b which are concentrically disposed on the core 5a and a plurality of coils 5c disposed about the insulating members 5b. As shown, the upper insulating member 5b holds the upper side bearing 3.

Around the stator 5, there are arranged four permanent magnets 6 which are secured to the inner surface of a cut-shaped yoke 7 at evenly spaced intervals. The yoke 7 is secured to the motor shaft 2 at its diametrically reduced upper end and thus the yoke 7 and the motor shaft 2 rotate together as a single unit.

The cylindrical holder 4 has a flange 4a at its lower side, which is secured to a circuit protection case 10 of plastics through a plurality of rubber cushions 8. Each rubber cushion 8 is secured to the case 10 through a bolt (no numeral). The circuit protection case 10 generally comprises an upper-half part 11 which has the holder 4 secured thereto and a lower-half part 12 which is detachably connected to the upper-half part 11.

Within the circuit protection case 10, there are arranged a sensor magnet 13 which is fixed to a lower end of the motor shaft 2 to rotate therewith and a drive circuit which drives the motor shaft 2. The sensor magnet 13 is so constructed and arranged that portions corresponding to the four permanent magnets 6 have the same poles as the permanent magnets 6. The drive circuit comprises a filter section 20 which filters out surges from a supplied electric power, a switching section 30 which switches the path of the current from the filter section 20 thereby to vary the magnet fields generated by the stator 5 and a control section 40 which controls rotation of the motor shaft 2 by controlling the switching timing of the switching section 30.

Figure 2:
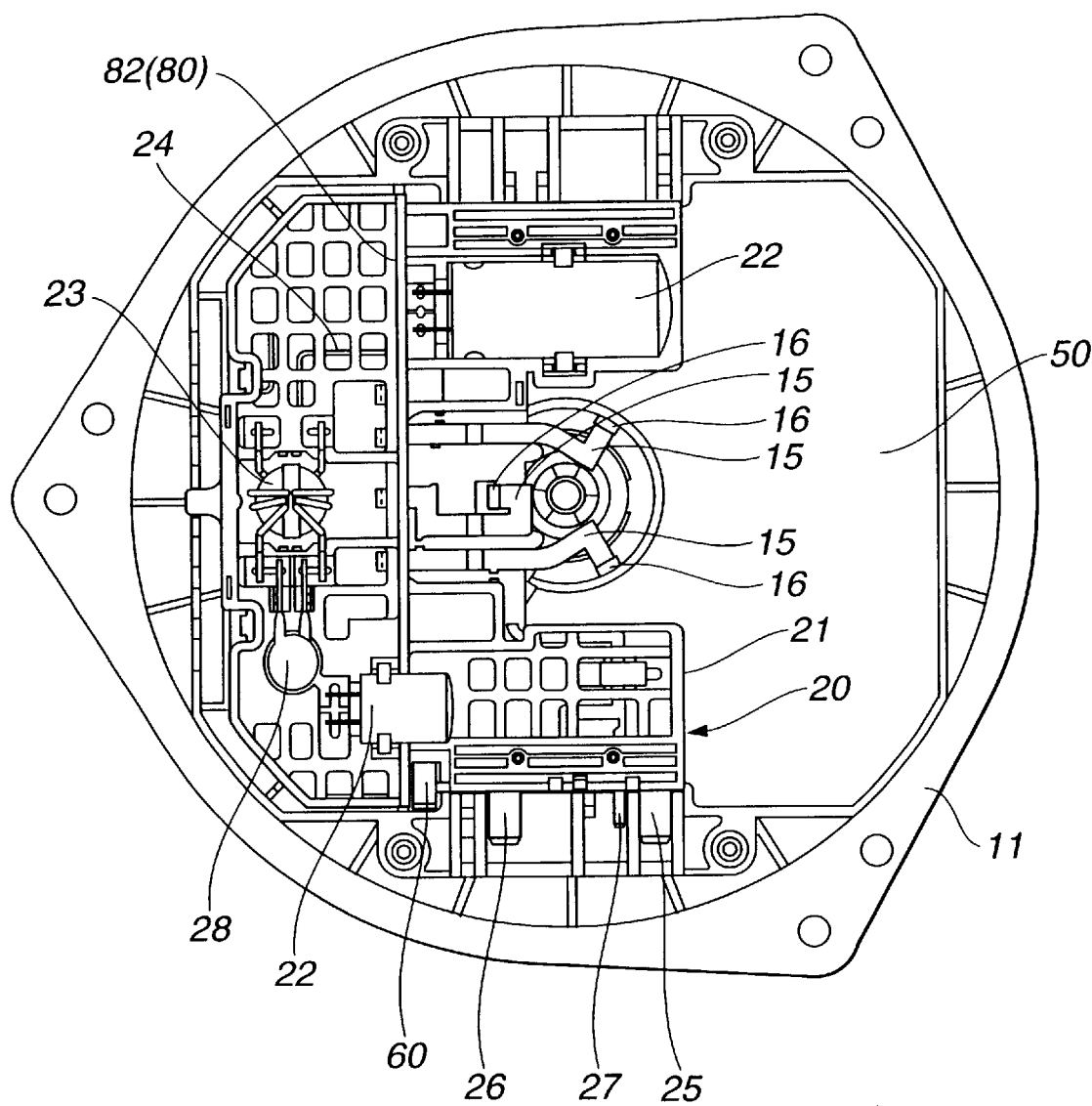
FIG. 2 is a view taken from the direction of the arrow "II" of FIG. 1 with a lower-half part of a case removed from the drawing.

The filter section 20 is installed in a plastic inner case 21 connected to the upper-half part 11 of the circuit protection case 10 and comprises an electrolytic capacitor 22, a common-mode choke coil 23 and a wiring bus bar 24 (see FIG. 2). The switching section 30 and the control section 40 are provided on a common circuit substrate 14.

The switching section 30 comprises six switching elements 31 which switch the path of current directed to the coils 5c of the stator 5 from the filter section 20. In FIG. 1, the switching circuit 30 is arranged at a left portion of the circuit substrate 14.

The control section 40 comprises an integrated circuit 41 which controls the switching timing of each switching element 31 and a Hall element (not shown) which detects an angular position of the permanent magnets 6 with the aid of the sensor magnet 13. In FIG. 1, the control section 40 is arranged on a right part of the circuit substrate 14.

The switching elements 31 are pressed against an aluminum heat sink 32 by means of a spring member 33. The heat sink 32 is formed with a plurality of heat radiation fins 32a which are exposed to the open air as shown. From these fins 32a, a marked heat generated by the switching elements 31 and transmitted to the heat sink 32 is released to the outside of the circuit protection case 10, that is, to the open air. The heat sink 32 is in the shape of arch and secured to the circuit substrate 14. As shown, the heat radiation fins 32a are exposed to the open air through an opening formed in a front wall part of the upper-half part 11 of the case 10. The spring member 33 is fixed to the circuit substrate 14. The plastic inner case 21 and the circuit substrate 14 are connected through bolts to bosses which are projected from a rear wall of the upper-half part 11 of the case 10.

FIG. 2 is a view taken from the direction of the arrow "II" of FIG. 1 with the lower-half part 12 of the case 10 removed.

As is seen from FIG. 2, within the plastic inner case 21, there are arranged a plus terminal 25 which is to be connected to a plus terminal of a battery (not shown), an earth terminal 26 which is to be connected to a body of an associated motor vehicle and a signal terminal 27 which receives signals from an external control equipment. The plus terminal 25 and the earth terminal 26 are connected to the filter section 20 of the drive circuit through the wiring bus bar 24. Denoted by numeral 28 is a varistor (variable resistor) to which the wiring bus bar 24 is also connected.

Figure 3:
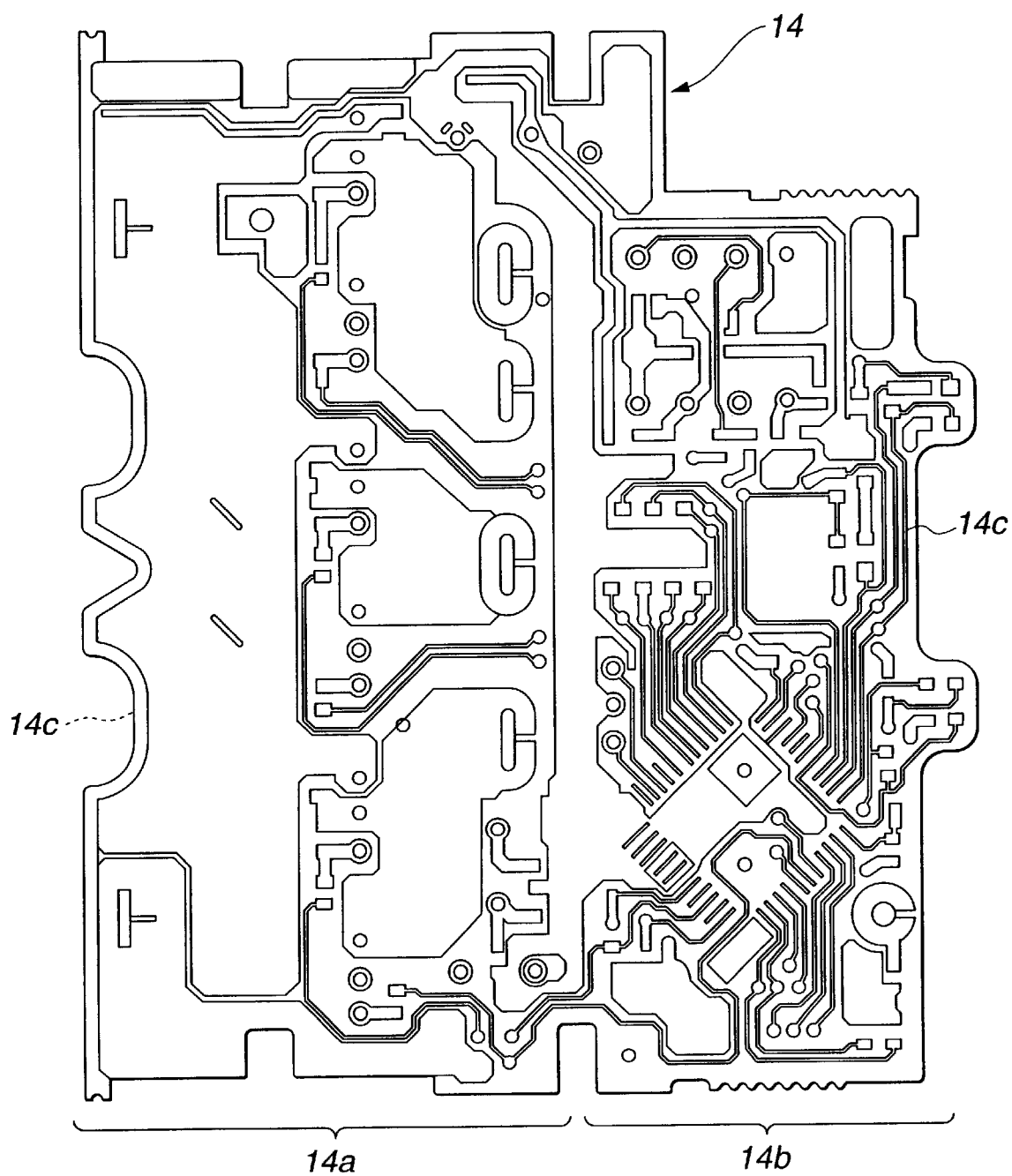
FIG. 3 is a back view of a circuit substrate employed in the brushless motor of the first embodiment.

FIG. 3 is a back view of the circuit substrate 14. The signal terminal 27 of the inner case 21 is connected to a second part 14b of the circuit substrate 14. The switching section 30 of the drive circuit is formed on a first part 14a of the circuit substrate 14. As is seen from FIGS. 2 and 3, the wiring bus bar 24 (see FIG. 2) has terminals which are projected toward the circuit substrate 14 to connect to given portions of the first part 14a. With this, the filter section 20 and the switching section 30 are connected.

As is seen from FIG. 3, on a boundary part between the first part 14a and the second part 14b of the circuit substrate 14, there is arranged only a printed wiring pattern 14c covered with an insulating film. That is, the switching elements 31 of the switching section 30 and the integrated circuit 41 of the control section 40 are not mounted on the boundary part of the circuit substrate 14.

It is to be noted that an upper surface of the circuit substrate 14 at a portion corresponding to the boundary part between the first and second parts 14a and 14b has only the wiring pattern 14c covered with an insulating film 14c. As will become apparent as the description proceeds, to the upper surface of the corresponding portion of the substrate 14, there contacts a lower edge of a first section 81 of a partition wall 80 (see FIG. 1), and to the lower surface of the corresponding portion of the substrate 14, there contacts an upper edge of a second section 82 of the partition wall 80. The switching section 30 and the control section 40 are connected through the wiring pattern 14c of the circuit substrate 14.

As is seen FIGS. 1 and 2, the switching section 30 and the coils 5c of the stator 5 are connected through three connecting bus bars 15 which are held by the inner case 21 and three terminal pins 16 which pass through the wall of the upper-half part 11 of the case 10. As is seen from FIG. 1, each terminal pin 16 has a projected part held by a seal member 17 of rubber. The seal member 17 hermetically seals the passage of upper-half part 11 of the case 10 through which the terminal pin 16 passes.

The heat sink 32 is electrically connected to a ground pattern of the wiring pattern 14c of the circuit substrate 14. The ground pattern is connected to a ground terminal of the connecting bus bars 15 which are connected to the earth terminal 26 (see FIG. 2). As is seen from FIG. 2, to the wiring bus bar 24 connected to the earth terminal 26, there is arranged an after-mentioned clip member 60.

Figure 4:
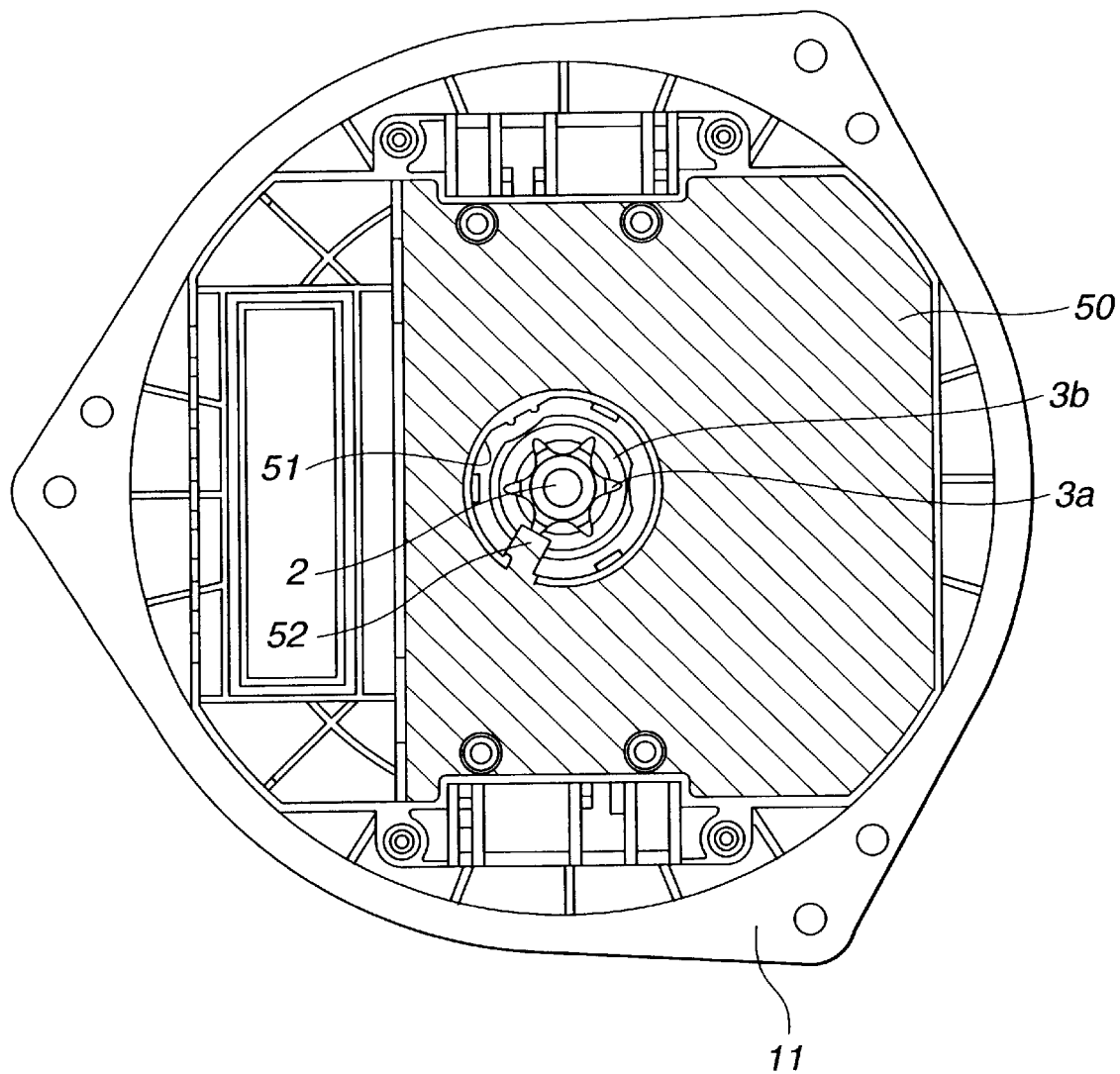
FIG. 4 is a view similar to FIG. 2, but with a drive circuit and a sensor magnet removed from the drawing.

FIG. 4 is a view similar to FIG. 2, but with the drive circuit and the sensor magnet 13 removed from the drawing. As is seen from FIGS. 2 and 4, on an inner surface of the upper-half part 11, there is disposed a rectangular shielding plate 50 of metal. The shielding plate 50 functions to shield radio noises emitted from the drive circuit in the circuit protection case 10. The shielding plate 50 is made of a resilient metal plate.

As is seen from FIG. 4, the shielding plate 50 is formed with a circular opening 51 through which the motor shaft 2 passes. The circular opening 51 is formed with a smaller rectangular piece 52 projected thereinto. As shown, the rectangular piece 52 is resiliently engaged with one of projections of a retainer 3a of the lower bearing 3 (see FIG. 1). The retainer 3a is made of a metal and holds an impregnated metal member 3b which slidably contacts the motor shaft 2. Thus, as is seen from FIGS. 1 and 4, the shielding plate 50 is electrically connected to the motor shaft 2 through the retainer 3a and the impregnated metal member 3b, and electrically connected to the cup-shaped yoke 7 through the motor shaft 2.

Figure 5:
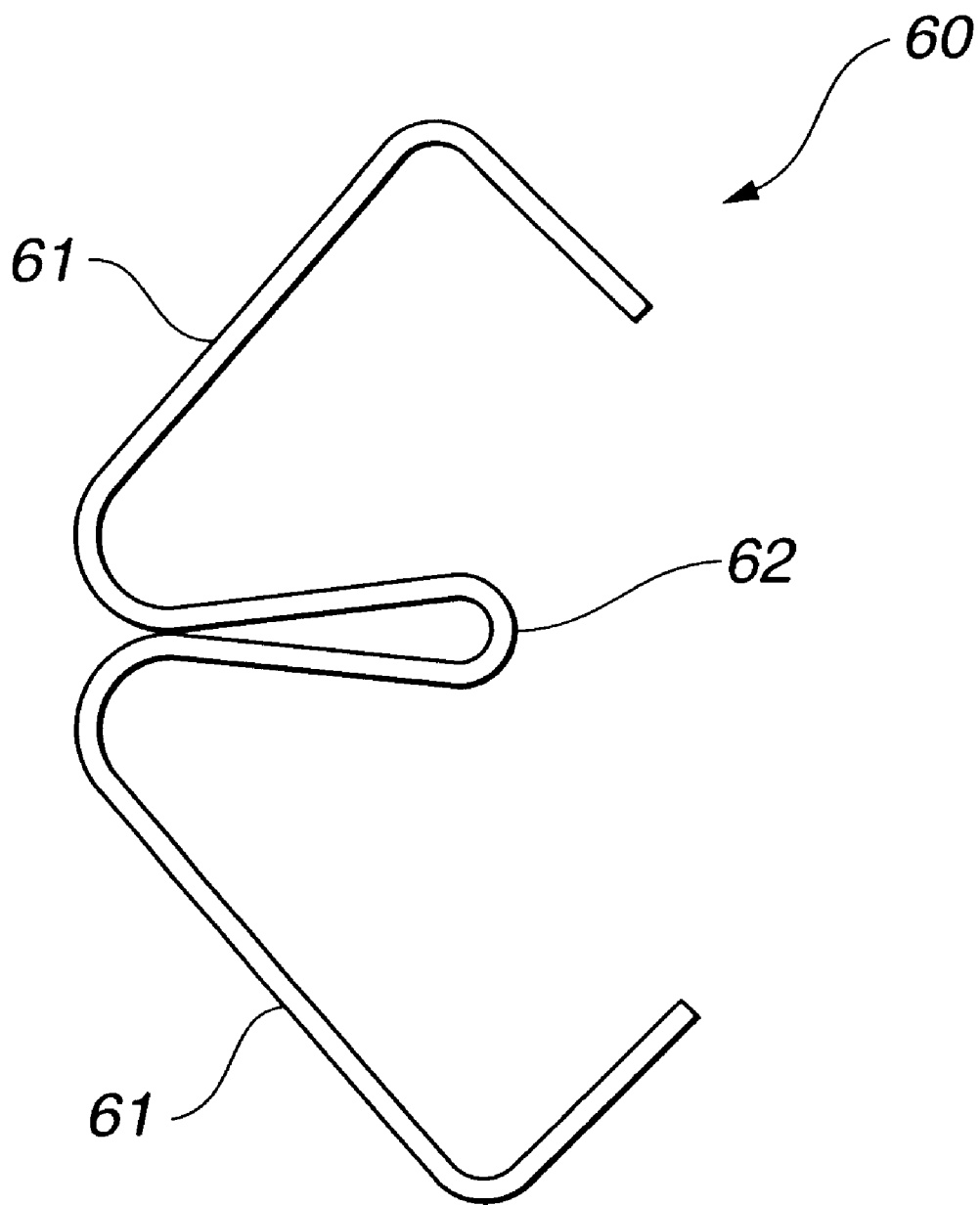
FIG. 5 is an enlarged view of a clip member employed in the brushless motor of the first embodiment.

Referring to FIG. 5, there is shown the above-mentioned clip member 60. This clip member 60 is made of a metal plate and comprises a pair of resilient wing portions 61 and a turned-up center portion 62 through which the wing portions 61 are connected. As may be understood from FIG. 2, the clip member 60 is so arranged that the turned-up center portion 62 thereof is inserted into the wiring bus bar 24 near the earth terminal 26 having one of the resilient wing portions 61 thereof pressed against the shielding plate 50 and the other of the wing portions 61 thereof pressed against a noise shielding plate 70 of metal (see FIG. 1) put on an inner surface of the lower-half part 12 of the case 10. Thus, the two shielding plates 50 and 70 are electrically connected to the earth terminal 26 through the clip member 60 and the wiring bus bar 24. The cup-shaped yoke 7 is electrically connected to the earth terminal 26 through the motor shaft 2, the bearings 3, the shielding plate 50, the clip member 60 and the wiring bus bar 24. The detail of the shielding plate 70 will be described hereinafter.

As is understood from FIG. 1, within the circuit protection case 10, there is provided the partition wall 80 by which the case 10 is divided into a first chamber 10a which contains therein the switching section 30 and a second chamber 10b which contains therein the control section 40. As has been mentioned hereinabove, the first part 14a of the circuit substrate 14 that constitutes the switching section 30 and the second part 14b of the circuit substrate 14 that constitutes the control section 40 are bounded by the partition wall 80.

The partition wall 80 comprises the first section 81 which contacts at its leading edge to the upper surface (as viewed in FIG. 1) of the circuit substrate 14 at the boundary part between the first and second parts 14a and 14b, and the second section 82 which contacts at its leading edge to the lower surface (as viewed in FIG. 1) of the circuit substrate 14 at the corresponding boundary part.

As shown in FIG. 1, the leading edge of the second section 82 is directed toward the bottom of the lower-half part 12 of the case 10 keeping a certain clearance (or slit) 83 defined therebetween. Accordingly, the first and second chambers 10a and 10b are communicated through the clearance 83.

As is seen from FIG. 1, the upper-half part 11 of the case 10 is formed near the switching element 31 with a first ventilation opening 11a through which the first chamber 10a is communicated with the open air. Although not shown in the drawing, a grid member is attached to the first ventilation opening 11a for suppressing invasion of foreign things into the case 10. Furthermore, the bottom wall 12a of the lower-half part 12 of the case is formed at its center portion with a second ventilation opening 12b through which the second chamber 10b is communicated with the open air.

Figure 6:
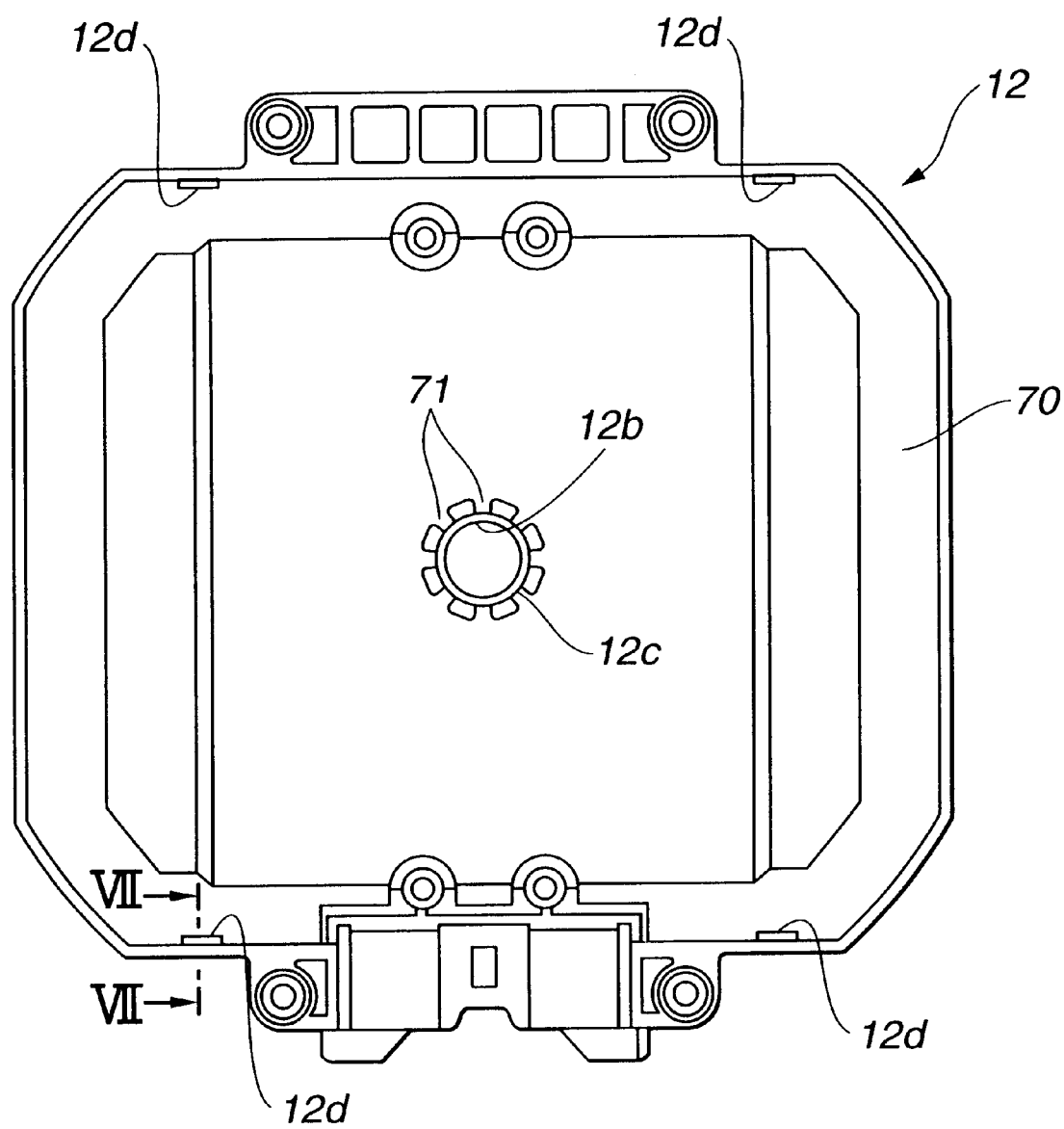
FIG. 6 is a plan view of the lower-half part of the case employed in the brushless motor of the first embodiment.
Figure 7:
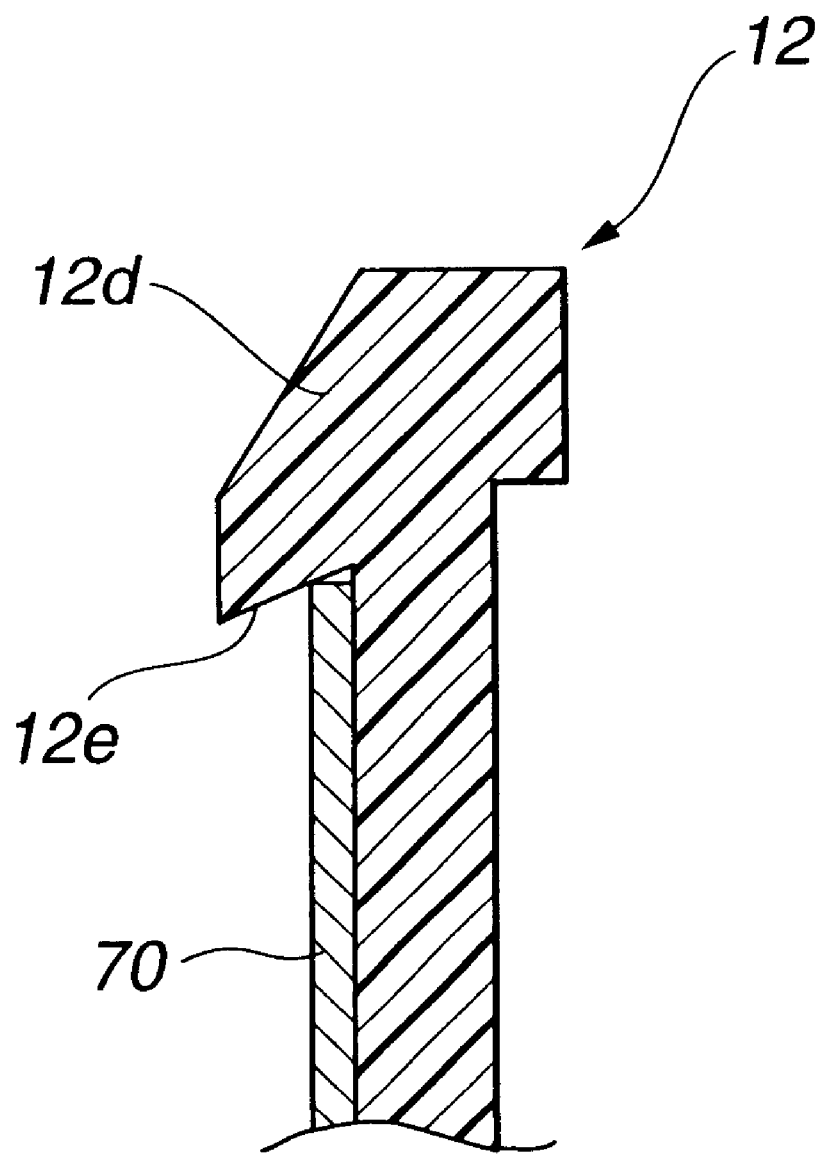
FIG. 7 is an enlarged sectional view taken along the line VII—VII of FIG. 6.

FIG. 6 is a plan view of the lower-half part 12 of the case 10, and FIG. 7 is an enlarged sectional view taken along the line VII—VII of FIG. 6.

As is understood from FIGS. 1 and 6, the shielding plate 70 is attached to the inner surface of the lower-half part 12 of the case 10. The shielding plate 70 is made of a resilient metal plate. The second ventilation opening 12b of the lower-half part 12 is formed with an annular projection 12c which passes through a center opening formed in the shielding plate 70. The center opening of the shielding plate 70 has circularly arranged resilient pawls 71 which resiliently abut against the annular projection 12c.

The inner surface of the lower-half part 12 of the case 10 is formed at a periphery with four pawls 12d for holding the peripheral portions of the shielding plate 70. As is seen from FIG. 7, each pawl 12d is formed with a sharply inclined inner surface 12e, so that once the peripheral edges of the shielding plate 70 are pressed into the bottom surface of the lower-half part 12 of the case 10 through the pawls 12d in a so-called snap action manner, the peripheral edges are tightly held in position. Due to the resilient abutting of the resilient pawls 71 against the annular projection 12c and the holding of the peripheral edges of the shielding plate 70 by the four pawls 12d, the shielding plate 70 is stably held on the inner surface of the lower-half part 12 of the case 10.

In the following, advantages expected from the above-mentioned first embodiment 1A of the present invention will be described.

First, due to provision of the partition wall 80 (see FIG. 1) which functions as a heat blocking wall, the second chamber 10b is protected from being heated by heat generated by the switching elements 31 held in the first chamber 10a. Furthermore, due to the heat sink 32, the heat generated by the switching elements 31 in the first chamber 10a is effectively released to the open air and the heated air in the first chamber 10a is discharged to the open air through the first ventilation opening 11a. Accordingly, the control section 40 of the drive circuit installed in the second chamber 10b is protected from heat. Thus, the electric parts 41 for the control section 40 do not need to have high heat protection and, thus, they do not need to be as expensive as typical ones.

Second, the second ventilation opening 12b formed in the bottom wall of the lower-half part 12 of the case 10, the second chamber 10b, the clearance 83, the first chamber 10a and the first ventilation opening 11a formed in the upper-half part 11 of the case 10 constitute a so-called ventilation passage. Under operation of the brushless motor 1A, heated air in the first chamber 10a is discharged to the open air through the first ventilation opening 11a. Due to this air discharging movement, relatively cool air existing near the second ventilation opening 12b is drawn into the ventilation passage from the opening 12b to travel therethrough and is discharged from the first ventilation opening 11a. Thus, the second and first chambers 10b and 10a of the case 10 are cooled and thus the electric parts including the switching section 30 and the control section 40 installed in the chambers are cooled.

Third, due to flow of air in the ventilation passage, the shielding metal plate 70 on the inner surface of the lower-half part 12 of the case 10 is cooled. Thus, the impedance of the plate 70 can be lowered increasing the shielding effect of the same.

Fourth, the shielding metal plate 70 is detachably fixed to the inner surface of the lower-half part 12 of the case 10 by means of the four pawls 12d provided by the part 12 and the resilient pawls 71 provided by the plate 70. Thus, various types of shielding plates can be attached easily to the lower-half part 12 at the need arises.

Fifth, the shielding plate 70 fitted to the lower-half part 12, the shielding plate 50 fitted to the upper-half part 11 and the heat sink 32 mounted in the upper-half part 11 are all electrically connected to the earth terminal 26. Thus, the impedance of the shielding plates 70 and 50 and the heat sink 32 to an earthed body of an associated vehicle can be lowered, and thus noises emitted from the drive circuit in the circuit protecting case 10 can be effectively blocked.

Sixth, the cup-shaped yoke 7 covering the stator 5 is electrically connected to the earth terminal 26 through the motor shaft 2, the bearings 3, the shielding plate 50, the clip member 60 and the wiring bus bar 24. Thus, the impedance of the yoke 7 to the vehicle body can be lowered and thus noises emitted from the coils 5c of the stator 5 can be effectively blocked by the yoke 7.

Seventh, the outwardly projected part of each terminal pin 16 is covered with the seal member 17 and, thus, is protected from rusting due to moisture attached thereto.

Referring to FIGS. 8 to 13A and 13B, there is shown a brushless motor 1B which is a second embodiment of the present invention.

Since the brushless motor 1B of the second embodiment is similar in construction to the brushless motor 1A of the first embodiment, the following description will be directed mainly to parts and portions of the second embodiment 1B which are different from those of the first embodiment 1A.

Like in the above-mentioned first embodiment 1A, within the circuit protection case 10, there are arranged the sensor magnet 13 which is fixed to the lower end of the motor shaft 2 and a drive circuit 54 which drives the motor 1B. The drive circuit 54 comprises a filter section 20 which filters out surges from a supplied power and a control section 61 which controls the magnetic field of the stator 5 by switching the path of current from the filter section 20 to the stator 5.

Figure 8:
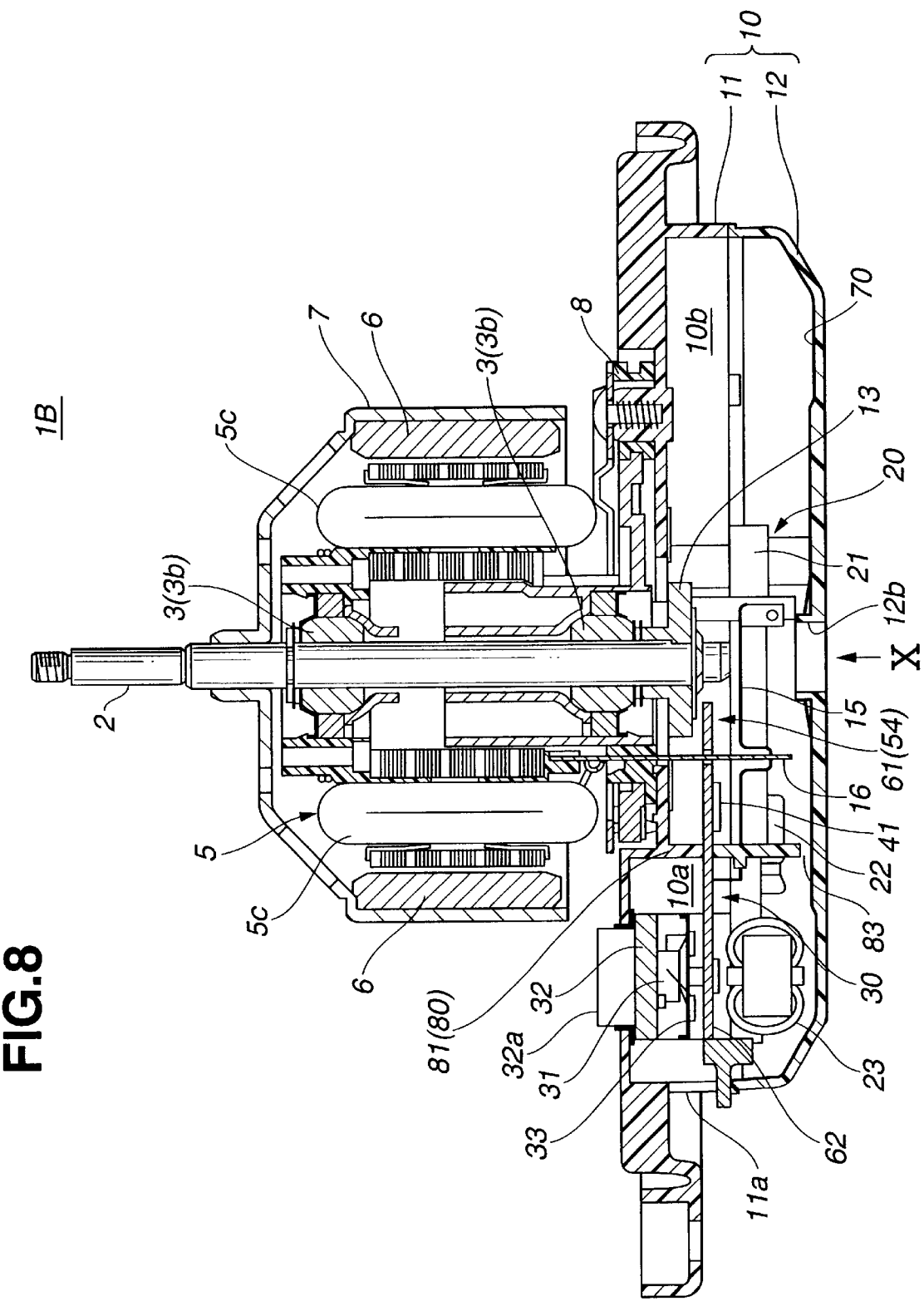
FIG. 8 is a sectional view of a brushless motor which is a second embodiment of the present invention.
Figure 9:
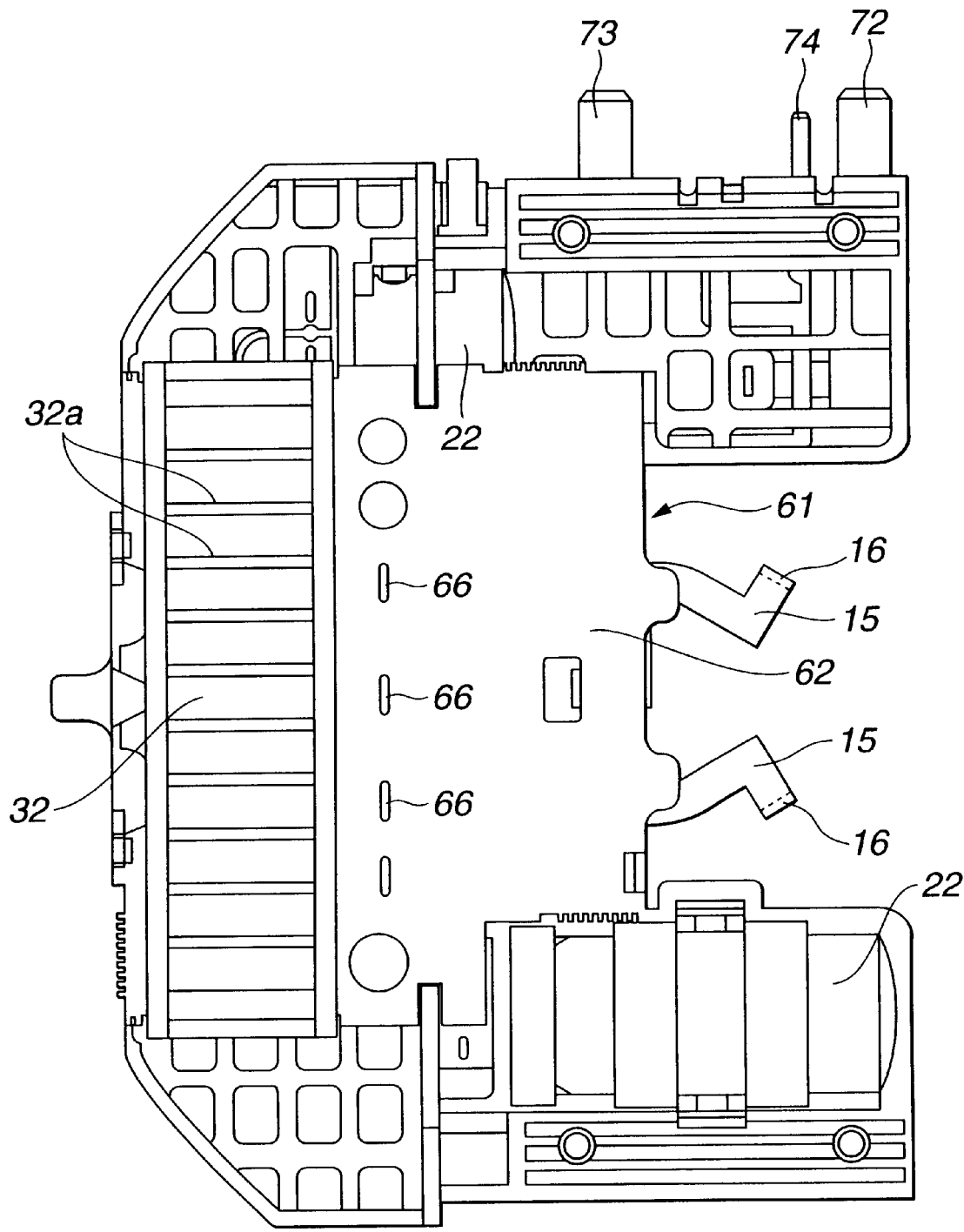
FIG. 9 is a plan view of a drive circuit employed in the brushless motor of the second embodiment.

FIG. 9 is a plan view of the drive circuit 54. As is seen from FIGS. 8 and 9, the control section 61 of the drive circuit 54 is provided on a circuit substrate 62. That is, on the circuit substrate 62, there are arranged switching elements 31 which switch the path of current directed to the coils 5c of the stator 5 from the filter section 20, an integrated circuit 41 which controls the switching timing of each switching element 31, a Hall element (not shown) which detects the angular position of the permanent magnets 6 with the aid of the sensor magnet 13 and an electrolyte capacitor 22.

The switching elements 31 are pressed against the aluminum heat sink 32 by means of the spring member 33. The spring member 33 is arranged below the switching elements 31 and fixed to the circuit substrate 62. The heat sink 32 is integrally formed with a plurality of heat radiation fins 32a. The heat sink 32 is secured to the circuit substrate 62.

Figure 10:
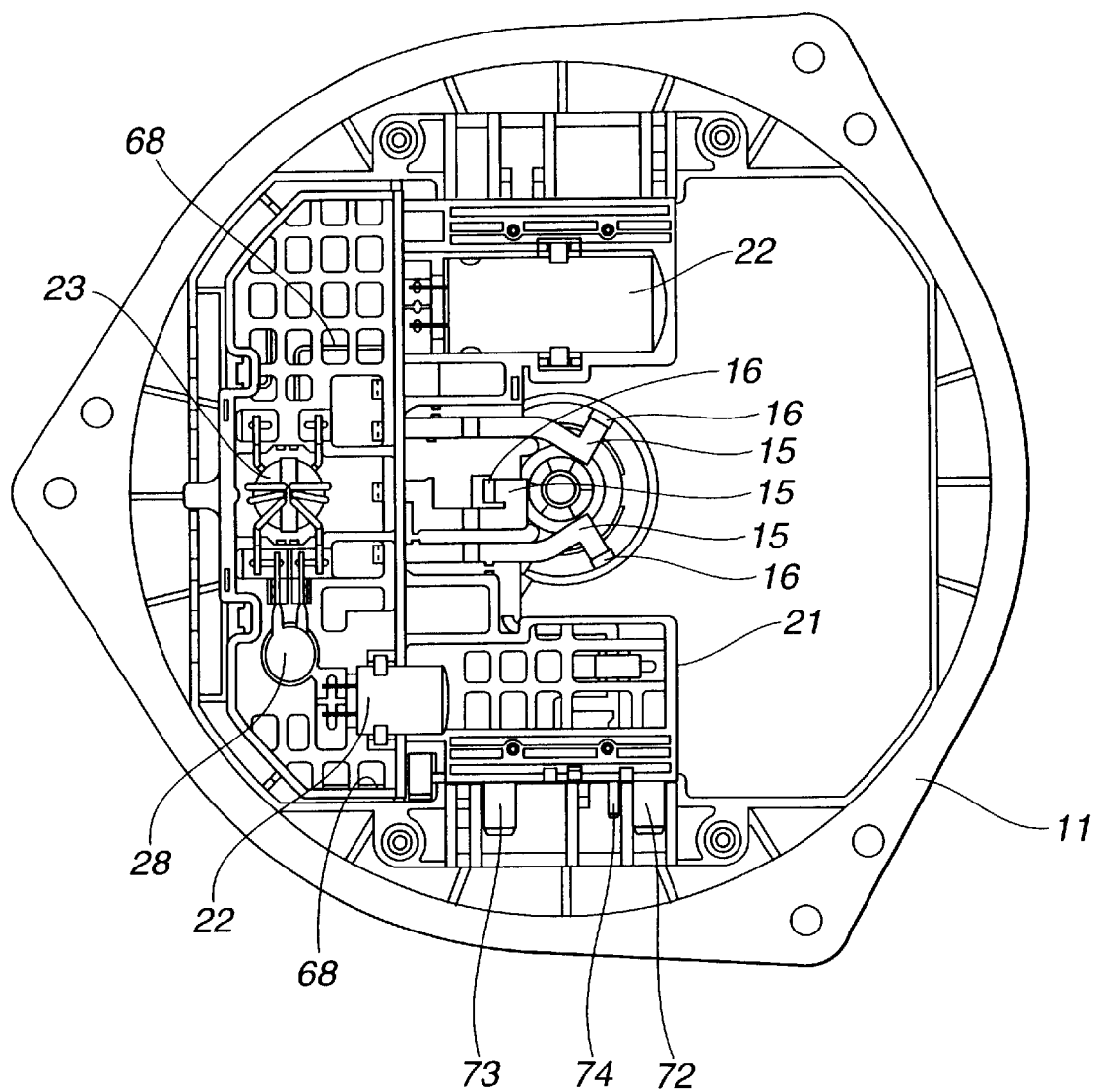
FIG. 10 is a view taken from the direction of the arrow "X" of FIG. 8 with a lower-half part of the case removed from the drawing.
Figure 11:
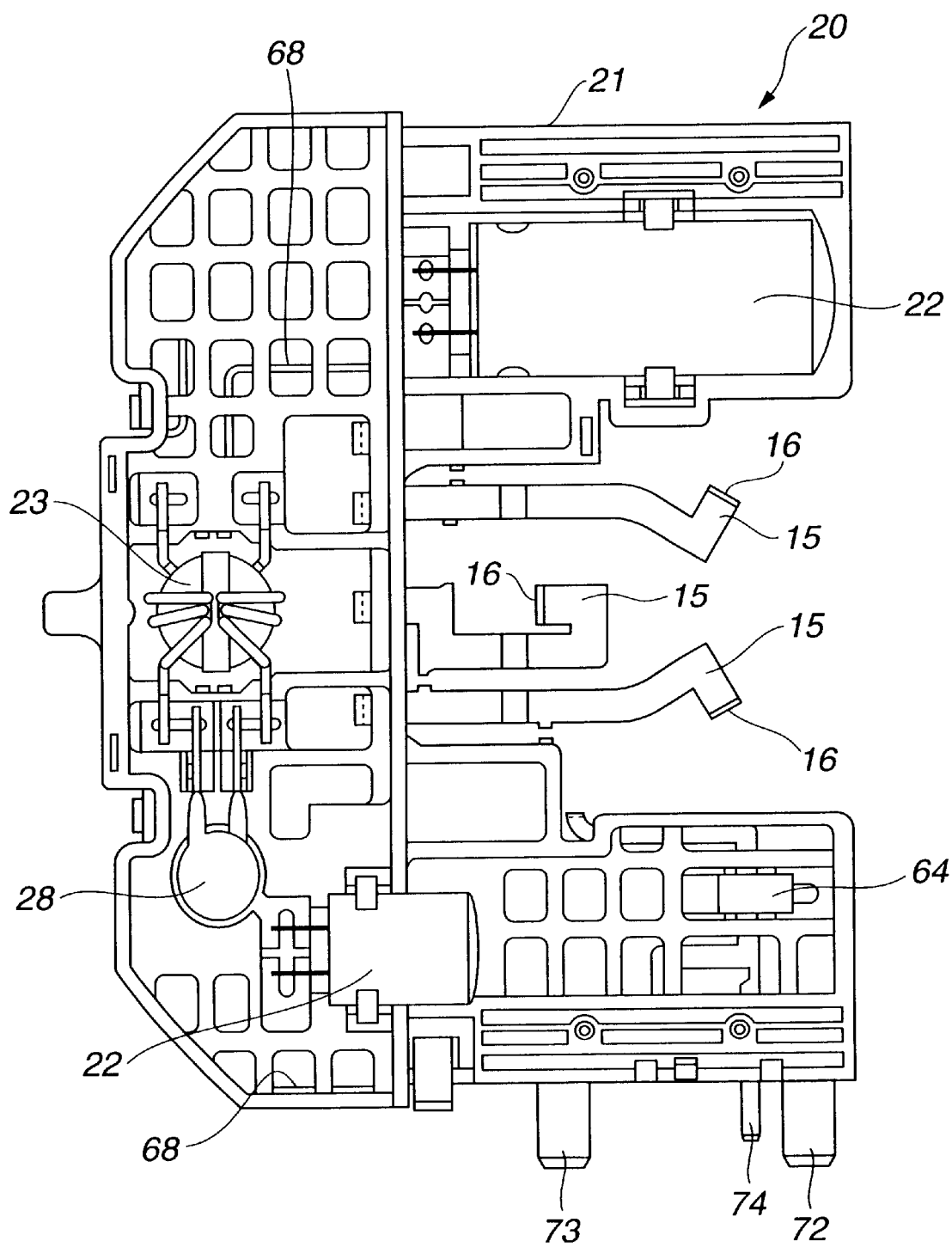
FIG. 11 is a plan view of a filter circuit employed in the brushless motor of the second embodiment.

FIG. 10 is a view taken from the direction of the arrow "X" of FIG. 8 with the lower-half part 12 of the case 10 removed. FIG. 11 is a plan view of the filter section 20. As is seen from these drawings, like in the above-mentioned first embodiment 1A, the filter section 20 is installed in the plastic inner case 21 fixed to the upper-half part 11 of the case 10 and comprises the electrolytic capacitor 22, the common-mode choke coil 23, the variable resistor 28 and a fuse 64 (see FIG. 11).

As is seen from FIG. 8, the inner case 21 is secured through bolts to a projection that extends downward from the upper-half part 11 of the case 10. The circuit substrate 62 is fixed to the inner case 21 and arranged above the same.

As is seen from FIGS. 10 and 11, to the inner case 21, there are mounted three connecting bus bars 15. The bus bars 15 are connected to the corresponding coils 5c of the stator 5 and welded to the three terminal pins 16. Each terminal pin 16 passes through the upper-half part 11 of the case 10 and is connected to the control section 61 (see FIG. 8) of the drive circuit 54. Between the stator 5 and the circuit substrate 62 of the control section 61, there is arranged a vibration isolation structure.

As is seen from FIG. 9, the other end of each bus bar 15 passes through an opening 66 formed in the circuit substrate 62 and welded to a given portion of the circuit on the circuit substrate 62. The welding of the bus bars 15 to the terminal pins 16 is carried out after the inner case 21 and the circuit substrate 62 are fixed to the upper-half part 11 of the case 10.

As is seen from FIGS. 10 and 11, to a given portion of the circuit substrate 62, there is welded a raised part of a wiring bus bar 68. With this, the filter section 20 and the control section 61 are electrically connected.

Figure 12:
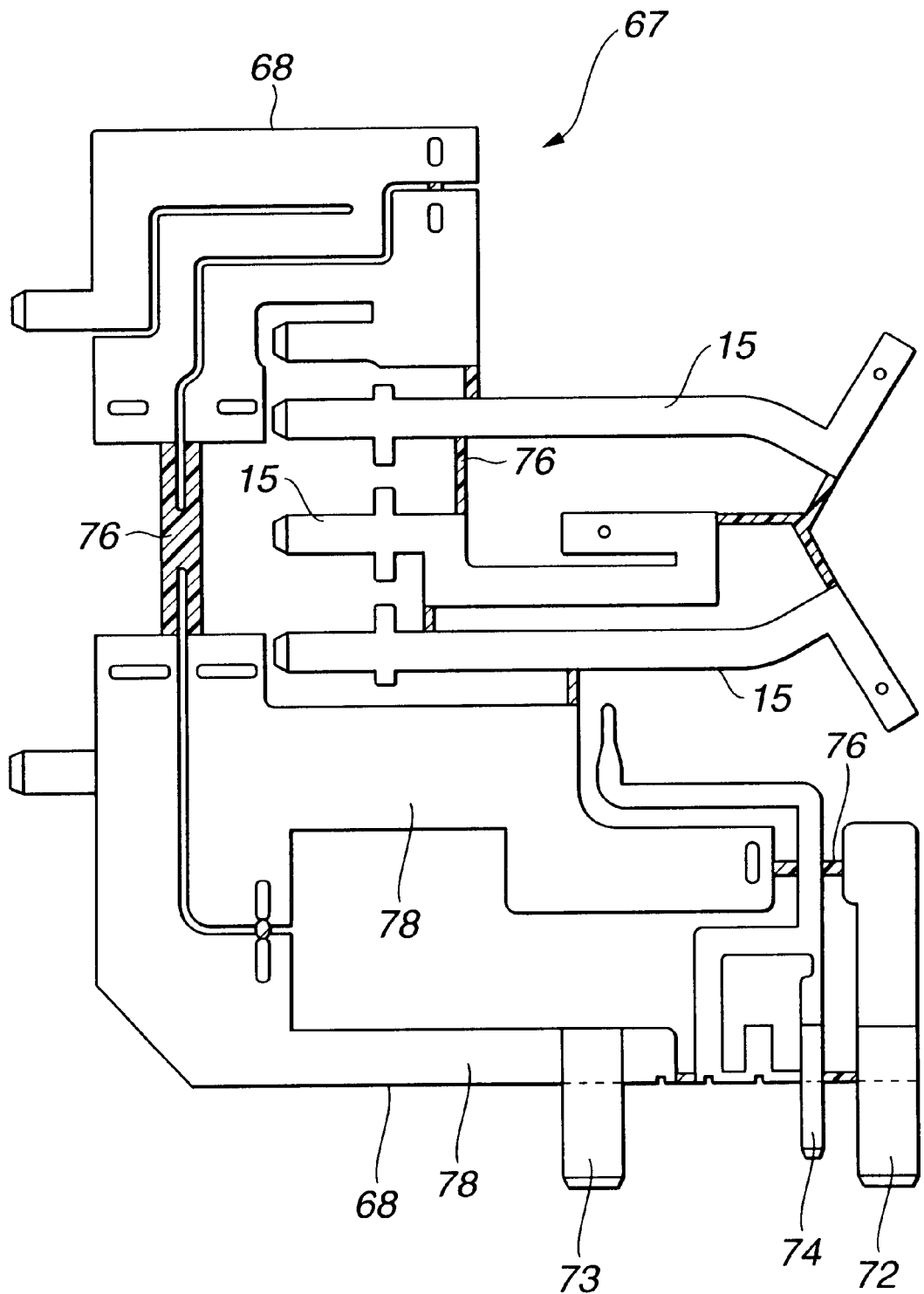
FIG. 12 is a back view of a unit including a wiring bus bar and connecting bus bars.
Figure 13A:
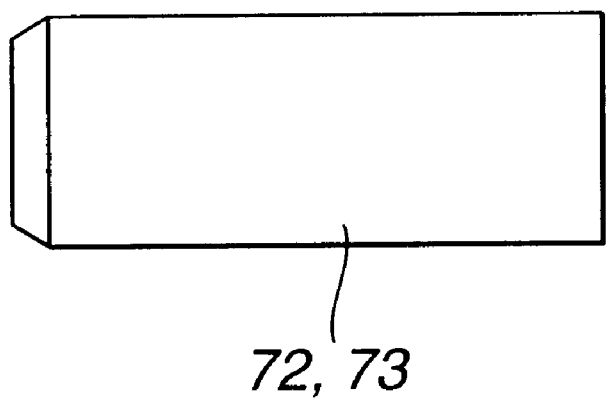

In FIG. 12, there is shown a molded flat unit 67 including the wiring bus bar 68 and the connecting bus bars 15, which is a semi-finished product. FIG. 13A shows an earth 73 (or plus 72) terminal and FIG. 13B shows a signal terminal 74, which are held by the flat unit 67 of FIG. 12.

As is shown in FIG. 12, in the semi-finished product 67, the wiring bus bar 68 and the connecting bus bars 15 are united through plastic bridge portions 76. After molding this product 67, the plastic bridge portions 76 are removed and given portions of the bus bars 68 and 15 are bent in desired directions.

Figure 13B:
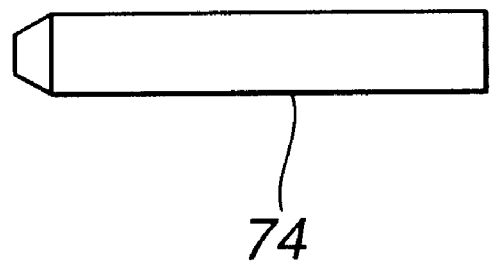

As is seen from FIGS. 12 and 13A and 13B, the plus terminal 72, the earth terminal 73 and the signal terminal 74 are welded to given portions of the wiring and connecting bus bars 68 and 15. Upon assembly, the welded portions are embedded in the plastic inner case 21.

As is seen from FIG. 11, upon assembly, the plus terminal 72 and the signal terminal 74 are connected by the fuse 64. The signal terminal 74 is connected to a given portion of the control section 61. Preferably, the signal terminal 74 is plated with gold or other highly conductive antioxidant metal for reliable electric connection with its counterpart (viz., female member).

Figure 14:
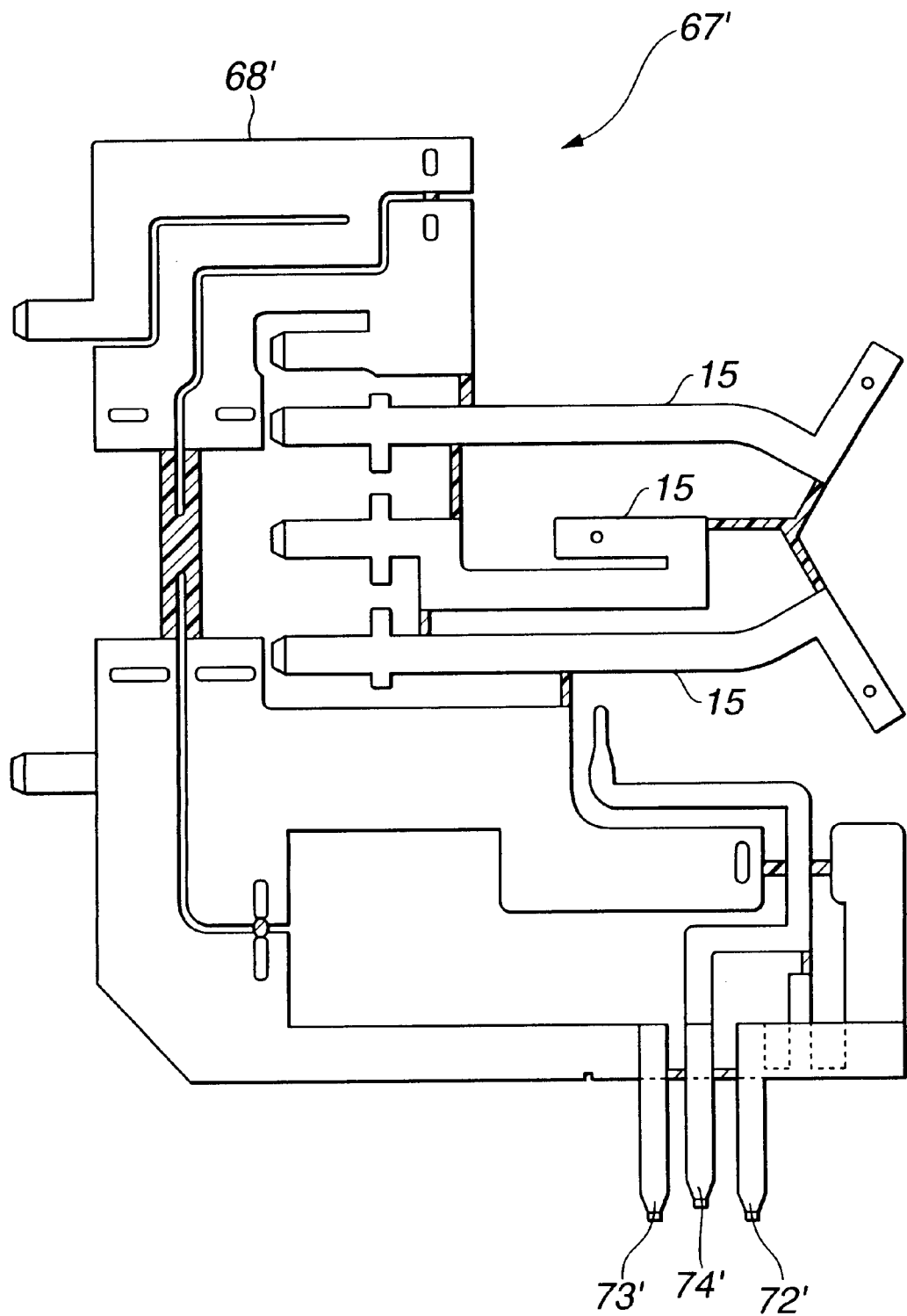
FIG. 14 is a view similar to FIG. 12, but showing a modification of the unit including the wiring bus bar and the connecting bus bars.
Figure 15A:
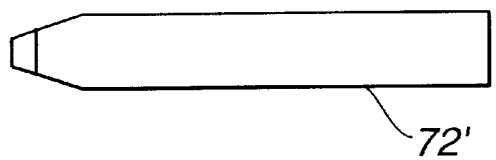
Figure 15B:
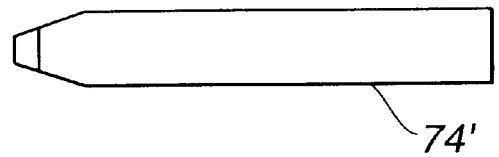
Figure 15C:
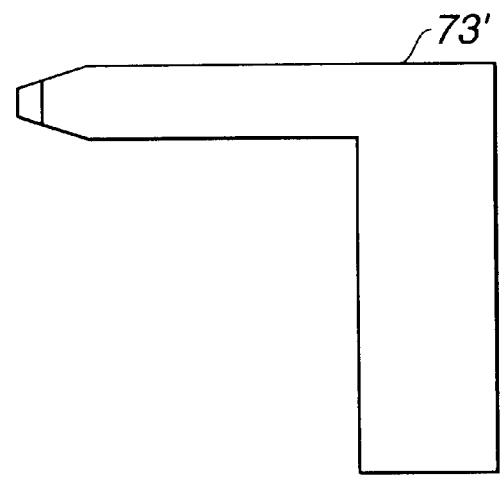
Figure 16:
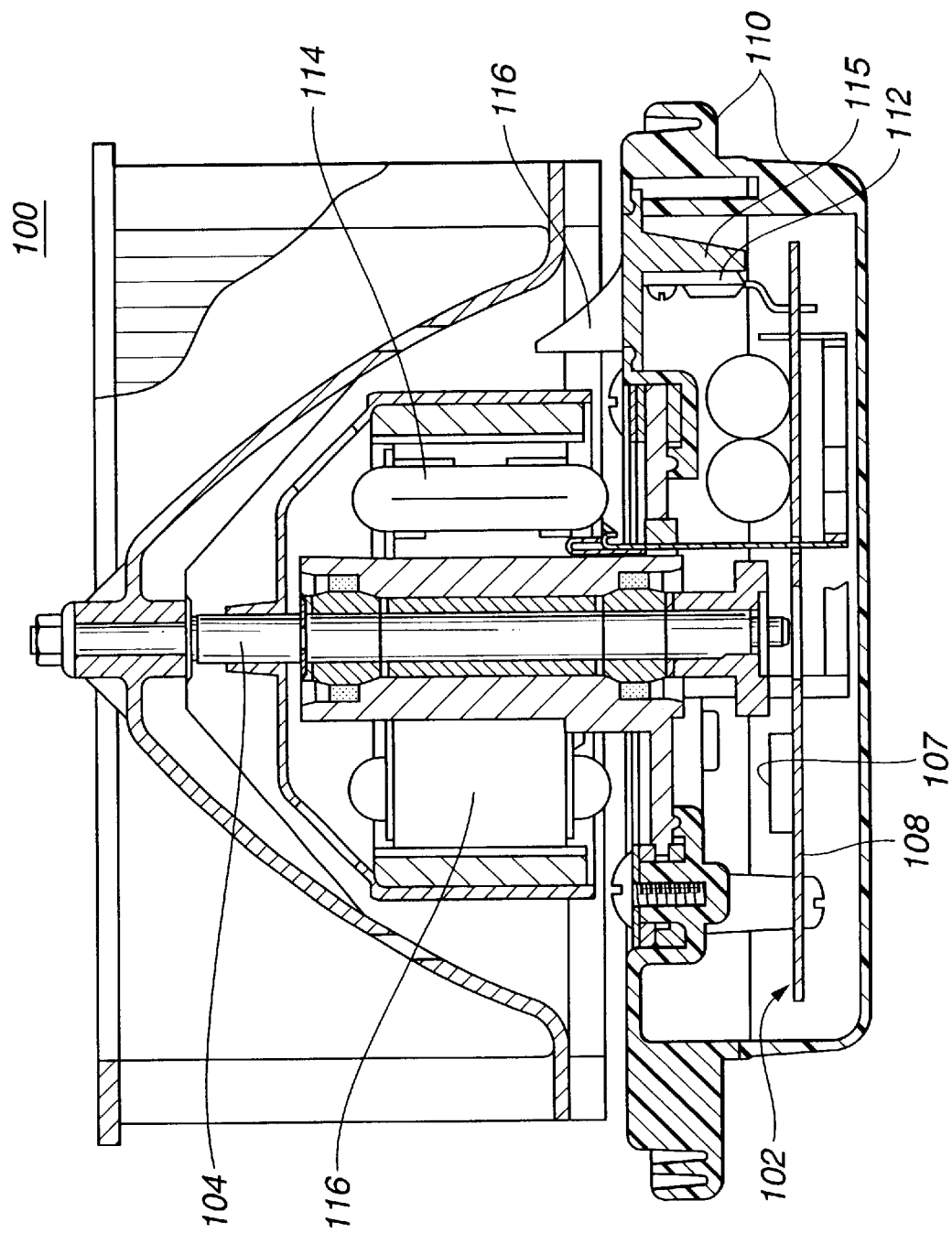
FIG. 16 is a sectional view of a first conventional brushless motor.

In FIG. 14, there is shown a modification 67' of the above-mentioned molded flat unit 67. FIGS. 15A, 15B and 15C respectively show earth, signal and plus terminals 72', 74' and 73' which are held by the flat unit 67' of FIG. 14. Similar to the above-mentioned flat unit 67, the earth, signal and plus terminals 72', 73' and 74' are welded to given portions of the wiring and connecting bus bars 68 and 15. Upon assembly, the welded portions are embedded in the plastic inner case 21.

In the following, advantages expected from the above-mentioned second embodiment 1B of the present invention will be described.

Figure 17:
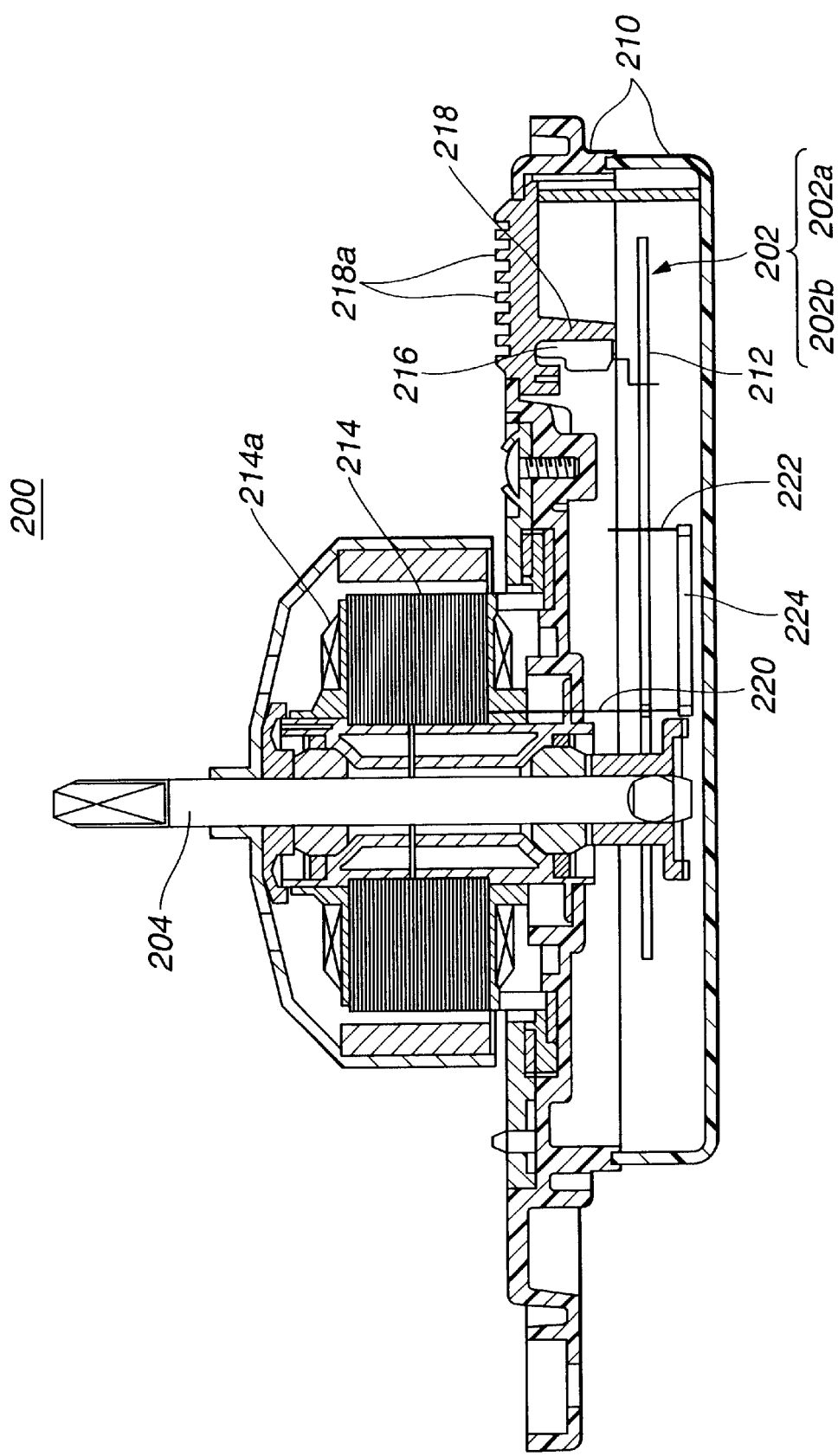
FIG. 17 is a sectional view of a second conventional brushless motor.

First, due to provision of the connecting bus bars 15 each having one end connected to the circuit substrate 62 and the other end connected to the terminal pin 16, there is no need of using a member such as the joint bar 222 employed in the conventional brushless motor of FIG. 17. Accordingly, the troublesome and time-consuming work for assembling the motor, which is inevitable in the conventional motor 200, is avoided in this second embodiment 1B. Furthermore, due to non-usage of the joint bar 222, the marked power consumption by the same is avoided in the motor 1B, which increases the working efficiency of the motor 1B.

Second, the connecting bus bars 15 are mounted to the inner case 21 and welding of the terminal pins 16 to the bus bars 15 is carried out after the inner case 21 is fixed to the upper-half part 11 of the case 10. That is, during the welding of the pins 16 to the bus bars 15, the inner case 21 can serve as a positioning tool for the bus bars 15. In case of the conventional brushless motor 200 of FIG. 17, however, a similar tool is needed.

Third, each welded portion between the terminal 72, 73 or 74 and the bus bar 68 or 15 is embedded in the plastic inner case 21. Thus, the welded portion is mechanically reinforced and protected from oxidation.

The entire contents of Japanese Patent Applications 2000-057285 (filed Mar. 2, 2000) and 2000-085392 (filed Mar. 24, 2000) are incorporated herein by reference.

Although the invention has been described above with reference to the embodiments of the invention, the invention is not limited to such embodiments as described above. Various modifications and variations of such embodiments may be carried out by those skilled in the art, in light of the above descriptions.

What is claimed is:

1. A brushless motor comprising:
   a circuit protecting case;
   a holder disposed on said case;
   a motor shaft rotatably held by said holder;
   a stator disposed about said holder, said stator including a plurality of coils which surround said motor shaft;
   a yoke fixed to said motor shaft to rotate therewith, said yoke covering said stator with a given space therebetween;
   permanent magnets held by said yoke;
   a circuit substrate tightly held in said circuit protecting case;
   a drive circuit arranged on said circuit substrate, said drive circuit including a switching section which switches the path of current directed to said coils of the stator and a control section which controls a switching timing of said switching section, said switching section including a plurality of switching elements which generate a certain heat when operated;
   a partition wall provided in said circuit protection case to partition the interior of said case into a first chamber to which the switching elements of said switching section are exposed and a second chamber to which said control section is exposed;
   terminal pins extending from the coils of said stator; and
   connecting bus bars held by an inner case installed in said circuit protection case, each connecting bus bar having on end welded to a given part of said control section of said drive circuit and the other end welded to corresponding one of said terminal pins.

2. A brushless motor as claimed in claim 1, in which said circuit substrate is formed with openings through which said terminal pins pass.

3. A brushless motor as claimed in claim 2, in which said drive circuit further comprises a filter section which filters out surges from a supplied electric power, and in which said filter section has wiring bus bars which are held by said inner case.

4. A brushless motor as claimed in claim 3, which said wiring bus bars are respectively provided with connector terminals, each connector terminal being connected to the corresponding wiring bus bar via welding.

5. A brushless motor as claimed in claim 4, in which the welded portions between the wiring bus bars and the connector terminals are embedded in said inner case.

* * * * *